United States Patent [19]

Zulian

[11] Patent Number: 5,373,569

[45] Date of Patent: Dec. 13, 1994

[54] APPARATUS FOR REALTIME DETECTION OF DIGITALIZED IMAGE DEFECTS AND THEIR CORRECTION IN THE VISUALIZATION PROCESS

[75] Inventor: Ferruccio Zulian, Milan, Italy

[73] Assignee: BULL HN Information Systems Italia S.p.A., Turin, Italy

[21] Appl. No.: 61,446

[22] Filed: May 14, 1993

[51] Int. Cl.$^5$ .............................................. G06K 9/40
[52] U.S. Cl. ............................................ 382/54; 382/44
[58] Field of Search ...................... 382/33, 42, 48, 54, 382/44, 41; 364/724.01, 724.11, 724.12; 358/448, 463, 464

[56] References Cited

U.S. PATENT DOCUMENTS

| | | | |
|---|---|---|---|
| 3,644,890 | 2/1972 | Matthews | 340/146.3 |
| 4,027,284 | 5/1977 | Hoshino et al. | 340/146.3 |
| 4,510,617 | 4/1985 | Mori | 382/33 |
| 4,607,387 | 8/1986 | Miyagawa | 382/33 |
| 4,862,402 | 8/1989 | Shah et al. | 364/724.12 |
| 5,016,207 | 5/1991 | Fujii et al. | 364/724.12 |
| 5,027,423 | 6/1991 | Kawata et al. | 382/54 |
| 5,140,538 | 8/1992 | Bass et al. | 364/602 |
| 5,202,933 | 4/1993 | Bloomberg | 382/33 |
| 5,261,010 | 11/1993 | Lo et al. | 382/42 |

*Primary Examiner*—Joseph Mancuso
*Attorney, Agent, or Firm*—Edward D. Manzo; Mark J. Murphy

[57] ABSTRACT

Apparatus for the detection and correction of digitized image defects comprising a plurality of registers for storing a plurality of bits representative of a portion of digitized image comprising a central pixel and pixels surrounding the central one, means for reading out from said registers, through a sequence of reading operations, the level of the bits representative of said central pixel and of the pixels in the same row and column of said central pixel with a first read operation and the level of the bits representative of rows and columns of pixels adjacent to the central pixel and more and more far therefrom at each subsequent read operation, four sequencers receiving said bit levels and respectively analyzing a sector of the image portion located left, right, above and below the central pixel, the sequencers providing signals as result of such analysis to a decoder which outputs correction codes dependent on such analysis to a control unit of a visualization unit.

5 Claims, 3 Drawing Sheets

APPARATUS FOR REALTIME DETECTION OF DIGITALIZED IMAGE DEFECTS AND THEIR CORRECTION IN THE VISUALIZATION PROCESS

BACKGROUND OF THE INVENTION

The present invention relates to an apparatus for detection and correction of digitized images defects, particularly for use in electrophotographic printers.

DESCRIPTION OF THE PRIOR ART

The image formed by an electrophotographic printer or by a TV monitor is affected by error or digitized defects due to discreteness of the image resolution. In fact the image is built up from an electrical/logical model describing the image by means of a plurality of bits, each being representative of an image element or pixel. The pixels are arranged in a matrix of rows and columns of discrete points.

With an image representation of this kind, each line or figure edge which is not vertical or horizontal is displayed as a line or an edge having stepwise discontinuities known as "jaggies". The "jaggies" are perceived as errors or defects.

By increasing the resolution of the digital model of the image, the quality image can be improved.

The printing and visualizing technologies which use a scanning beam (laser beam in electrophotographic printers, electron beam in TV monitors) offer at least partial solutions to the problem because they can modulate the size of the printed or displayed dots or change their location in the scanning direction.

The correction to be imparted to the size or location of the visualized dot is determined as a function of the relation of the dot to be displayed as to contiguous dots. It involves the detection of anomalies perceived as defects on a configuration of image dots.

The detection of image defects may be conceptually performed in two ways:

Detection by comparison with predetermined configurations or templates; or

Detection by means of image analysis.

The first method, described for example in U.S. Pat. No. 4,847,641, requires the simultaneous comparison of the configuration to be corrected with a plurality of templates. The method fits with the speed requirements imposed by electrophotographic printers and by the TV monitors but is limited, in correcting power, by the number of templates which may be practically compared.

The second method, which may be defined as "intelligent" is much more flexible and effective but implies a processing of the information which represent the image, by means of suitable algorithms. The processing must be repeated for each point of the image. It is therefore slow and unsuitable in the applications requiring a real time correction.

The limitations of the prior art are overcome by the apparatus of the present invention which is constructively simple and operatively fast.

SUMMARY OF THE INVENTION

The present invention enables the detection for each point of a digitized image, in the course of being visualized (also referred to as "central bit"), of the most suitable correction to be performed on the image element, by exploring a limited number of image pixels around the image element to be corrected, with a limited number of subsequent analysis operations in the order of tens.

The subsequent operations broaden step by step the exploration area. Further, in order to minimize the circuit complexity, the exploration of the image is performed by four distinct analyzing circuits which operate in parallel to explore the image pixels respectively located above, below on the right and on the left side of the image element to be corrected, in the image plane.

BRIEF DESCRIPTION OF THE DRAWINGS

The features and the advantages of the invention will result more clearly from the following description of a preferred form of embodiment and the enclosed drawings where.

DESCRIPTION OF THE PREFERRED EMBODIMENTS

Figure 1:
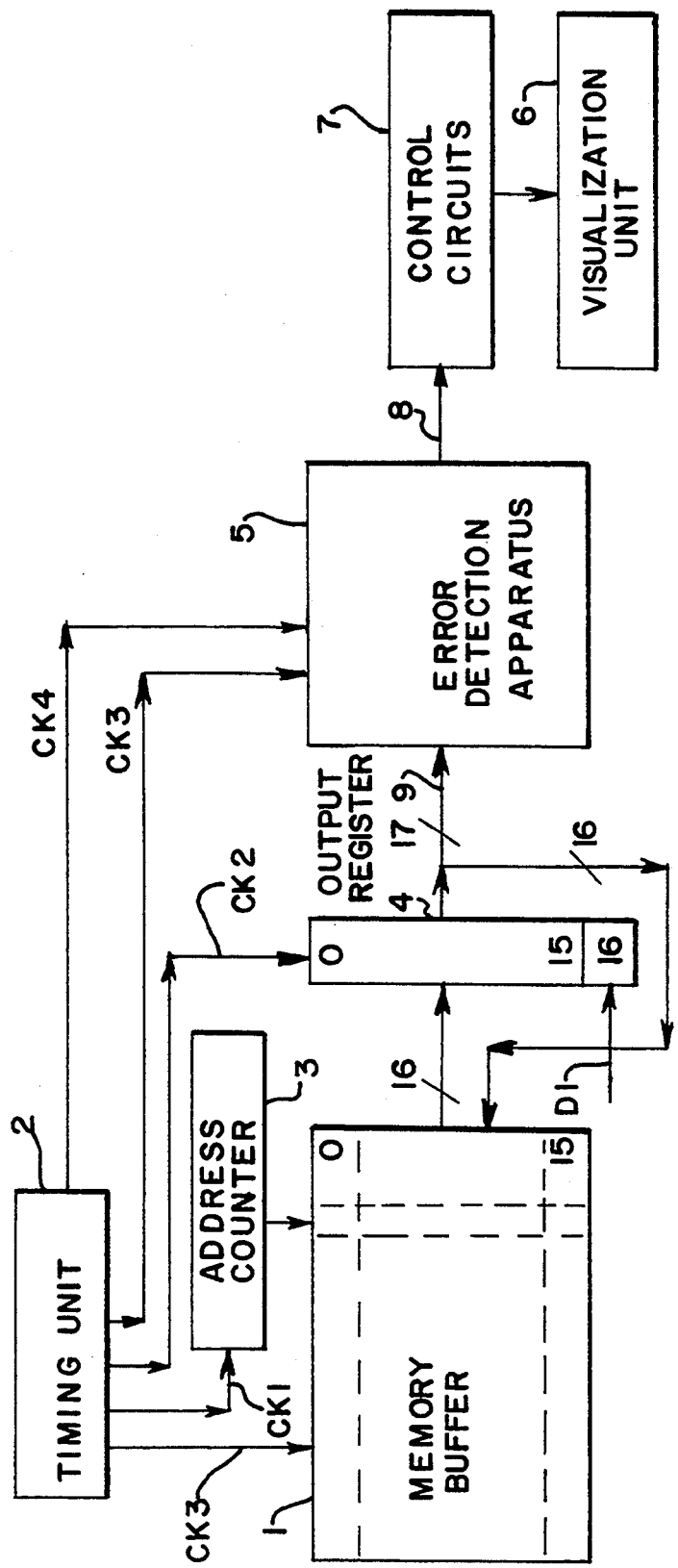
FIG. 1 is a block diagram of a digitized image visualization system provided with the detection apparatus of the present invention.

FIG. 1 shows in block diagram a digitized image visualization system provided with the detection apparatus of the present invention. The digitized image visualization system essentially comprises a memory buffer 1 storing a plurality of bits representative of a plurality of N consecutive rows of a digitized image, a timing unit 2, generating suitable timing signals CK1, CK2, CK3, CK4 an address counter 3 for addressing buffer 1, an output register 4 for buffer 1, a digitized image error detection apparatus 5; a visualization unit 6, for example a cathode ray tube in case of a TV monitor or a so called printing engine (in case of electrophotographic printer) and control circuits 7 for the visualization unit.

The counter 3, triggered by a periodic timing signal CK1, received from unit 2, cyclically addresses memory 1, which is read out and outputs N bits (preferably in number of 16) representative of a column of image pixels. These bits are latched in register 4 owing to a timing signal CK2 having the same period of CK1, together with an image bit D1 received from an external source of digital serialized image (for instance an image scanner or a computer). Bit D1 is queued to the previous one in register 4. By a timing signal CK3, subsequent to CK2 and having the same period, the bits latched in register 4 are transferred to the detection apparatus 5 and at the same time are rewritten, with the exception of the first bit, in buffer 1 at the currently addressed buffer location but vertically shifted a row.

Therefore in known manner, by subsequent read rewrite operation the contents of the buffer are updated so as to describe new image rows, subsequent to each other. Typically for an electrophotographic printer having a resolution of 300 dots per inch and operating at a speed of 10 pages per minute, the period P of signals CK1, CK2, CK3 may be of 360 $\eta$sec. It is well known that the period P must be related to the printing/visualization rate of the bits by the visualization unit. With the same period image bit, columns are loaded in the detection apparatus, which analyzes the status of the image bits located around a central bit and, by criteria which will be described later on, establishes if the central bit has to be visualized with some correction.

Figure 2:
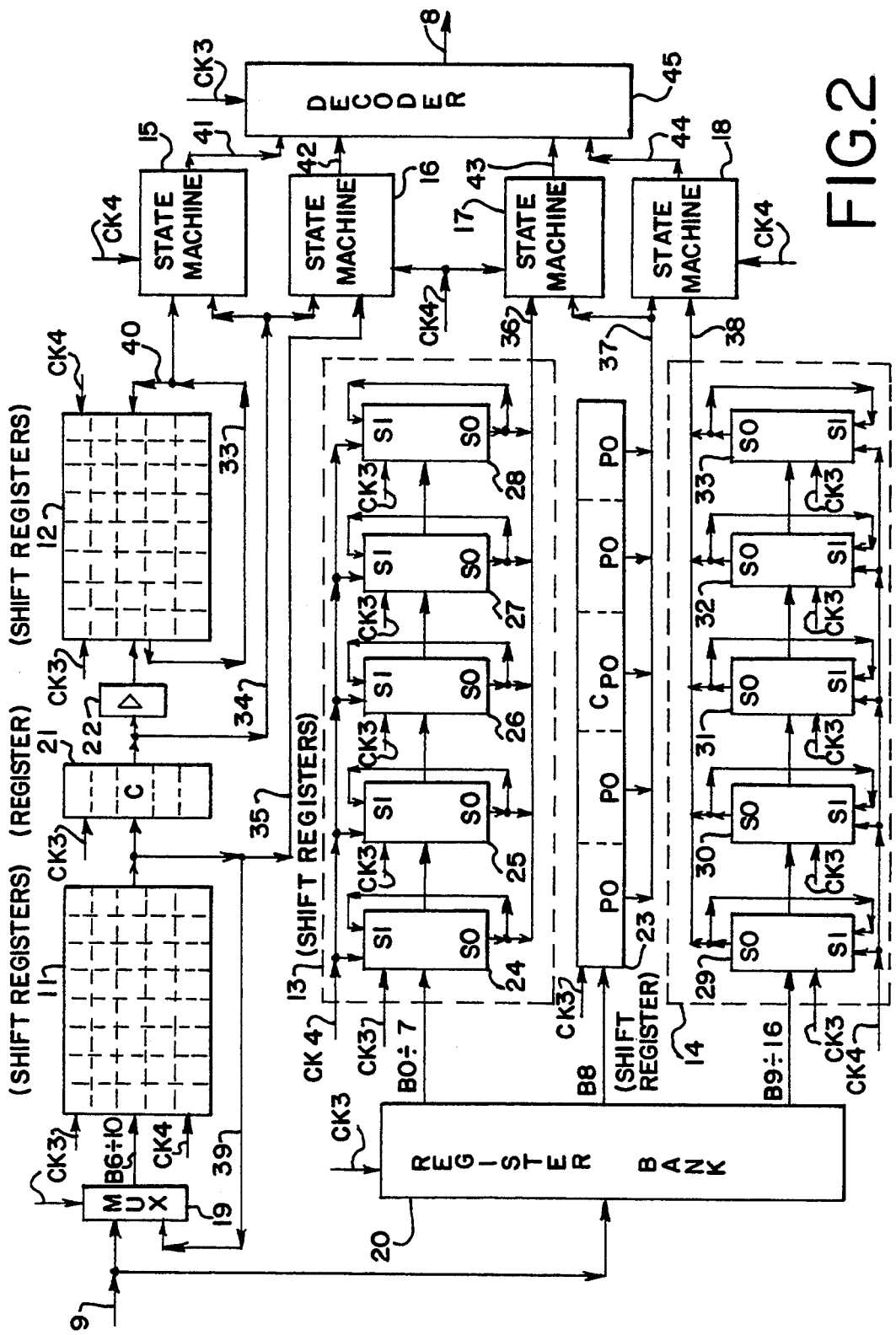
FIG. 2 is a block diagram of a preferred form of embodiment for the detection apparatus of the invention.

The most suitable correction information is output on channel 8 and input to the control circuits 7. The control circuits 7, in known manner, convert the received signals by control signals modulating the Light source 10 or the electron beam of visualizer 6, FIG. 2 shows in detailed block diagram the architecture of the detection unit 5. The detection unit 5 comprises a plurality of shift registers arranged in four blocks 11, 12, 13, 14, four logical sequencers structured as finite states machines 15, 16, 17, 18 and a decoder 45. The unit further comprises a multiplexer 19, a bank of cascaded register 20 acting as an aligning buffer, a register 21, isolation diodes 22 and a shift register 23.

More in detail, the detection unit 5 receives, through a channel 9, a plurality of image column bits B0, B1, ... B16 in number of 17. The 17 bits B0, ... B16, are loaded, owing to the timing signal CK3, in a first 17 bit registers of bank 20, having 5 cascaded register. Bank 20 may be also considered as a bank of 17 shift registers each storing 5 bits. At the same time, the contents preexisting in the bank 20 are shifted from the first register to the second, from the second to the third and so on. The contents of the fifth register are transferred and loaded, as it will be seen, into modules 13, 14 and into register 23. The intermediate bits from B6 to B10, within the plurality of bits B0 ... B16, are loaded through multiplexer 19 in a first cell of the shift registers of block 11, consisting of 5 registers each having 8 cells.

This occurs when the multiplexer is controlled by signal CK3. At the same time the contents of the registers in bank 11 are shifted towards the right (with reference to FIG. 2) and the output bits are loaded in register 21, which is controlled by signal CK3. The bits previously stored in register 21 are loaded, through the decoupling diodes 22 in a first cell of the registers forming bank 12, consisting of 5 registers having 8 cells each. Bank 12 is also controlled by signal CK3.

Module 13 consists of 5 shift registers 24, 25, 26, 27, 28 each having 8 cells, having the parallel outputs cascade connected. Module 13 is controlled by signal CK3. By signal CK3, bits B0-7 in output from bank 20 are loaded in register 24. While the previous contents of register 24 are shifted into register 25, those of register 25 into register 26 and so on. Likewise module 14 consists of 5 shift registers 29, 30, 31, 32, 33 each having 8 cells and the parallel outputs cascade connected. Module 14, too, is controlled by signal CK3. By signal CK3, bits B9-16 in output from bank 20 are loaded into register 29. The previous contents of register 29 are shifted into register 30 and so on.

Bit B8, in output from bank 20 is loaded, always by signal CK3, in the first cell of shift register 23 having 5 cells. The contents of the several cells of register 23 are shifted right one cell, owing to the same signal CK3.

The outputs of bank 12 and the outputs of register 21 are connected (through channel 33, 34 respectively) to the inputs of sequencer 15. The outputs of bank 11 and the outputs of register 21 are connected (through channel 35 and 34) to the inputs of sequencer 16. The serial outputs SO of registers 24, ... 28 in module 13 and the parallel outputs PO of register 23 are connected (through channel 36, 37 respectively) to the inputs of sequencer 17. The serial outputs SO of registers 29 ... 33 in module 14 and the parallel outputs PO of register 23 are connected (through channels 37, 38 respectively) to the inputs of sequencer 18.

In summary, at each timing pulse CK3, the described set of shift registers shifts right its contents one cell and receives from channel 9 a new column of image bit.

Within the period of timing signal CK3 a timing signal CK4 is further active. CK4 has a frequency multiple of the one of CK3 and, in the preferred embodiment, equal to 8 times the one of signal CK3.

Signal CK4 acts on register banks 11, 12, 13, 14 in the following manner. At each timing pulse CK4, the contents of register bank 11 are shifted right one cell and the information at the serial output is reentered, through channel 39 and multiplexer 19 in the first cell of the bank register. At each timing pulse CK4 the contents of register bank 12 are shifted left one cell and the information output from the first left cell is reentered through channels 33 and 40 into the last (right) cell of the registers.

Likewise at each timing pulse CK4, the contents of the registers in bank 13 are shifted one cell down, with reference to FIG. 2 and the information output at the serial outputs S0 is reentered in the first cell of the registers, through the serial inputs SI. Further at each timing pulse CK4, the contents of the register in bank 14 are shifted one cell up and the information output at the serial outputs SO is reentered in the first cell of the register, through the serial inputs SI.

In summary, within one period of signal CK3 and owing to signal CK4, the contents of banks 11, 12, 13, 14 are progressively shifted to the right, the left, downward and upward respectively and placed again in the original position, with a scanning operation by which the information stored in each of the cells of the register banks is made subsequently available at the output channels, by columns in banks 11, 12 and by rows in banks 13, 14.

This information is input to the state machines 15, 16, 17, 18 which, depending on the input signals evolve according to suitable criteria. As known, a state machine is a logical network which receives input signals, performs logical operations (AND, OR, NAND, EXCLUSIVE OR, etc.) and is set in a predetermined state, among a plurality of states, as a function of the input signals.

The machine further changes its status as a function of the preceding state and the changes in the signals received at the inputs.

A predetermined configuration of output signals, generated by the state machine, correspond to each state.

The information received in the course of a scanning operation, divided in eight phases, describes a bit map image related to a central pixel C (represented by the bit loaded in the central cell of register 21 and register 23) and to the pixels surrounding it. Thus, with reference to sequencer 15, it receives in a first phase the bits representative of the central pixel C, of the two pixels located above the central pixel in column and, of the two pixels located below the central pixel in column of the 5 pixels located in column at the right side of the previously indicated ones. In a second phase, the sequencer 15 receives the column of five bits representative of the pixel column at the right side, next to the already received column and so on.

The sequencers 15, 17, 18 receive a similar information set, the difference being that each sequencer receives scanning information spatially oriented as to the central pixel, and related to the pixels located at the right, above and below respectively of the central pixel. Each of the sequences has the task detecting particular image bit patterns, in limited number.

An elemental image bit pattern representing for instance a line of dots in succession, can have, in the bidimensional image space and relative to a reference central pixel, a differing orientation, but conceptually is only a line of dots in succession. Thus each of the sequencers has the task detecting only those patterns which have a predetermined orientation and not others. The consequence of this approach is that the number of bit patterns to be detected by each sequencer is drastically reduced and that the algorithms or logical operations to be performed by the several sequences may be the same. In other words the sequencers 15, 16, 17, 18 may be identical to each other.

In order to further clarify these concepts FIGS. 3 to 8 show the main bit patterns to be analyzed. In some of these figures the central pixel is referenced by letter C.

Figure 3:
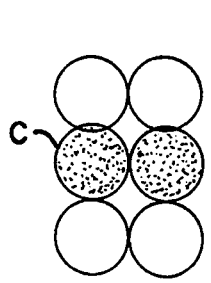
FIGS. 3 to 6 show in succession the detection phases performed by the apparatus of the inventions in detecting a defect present in the digital representation of a nearly horizontal line.

FIG. 3 shows a line, say a sequence of at least two dots which develops at the right of the central pixel, but which could develop at the left side, above or below the central pixel. This pattern is detected, in the first scanning phase, by sequencer 15 (should the pattern have a differing orientation it would be detected by one of the other sequencers) performing a very simple logical operation: the bits representative of the two line dots must be at logical level 1 and the adjacent bits, above and below must be at logical level 0. As a conseguence of this detection the sequencer is set in a first state.

Figure 4:
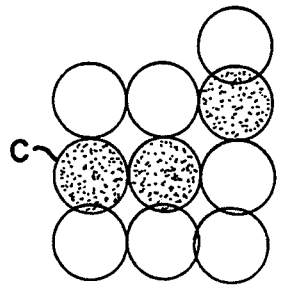
Figure 5:
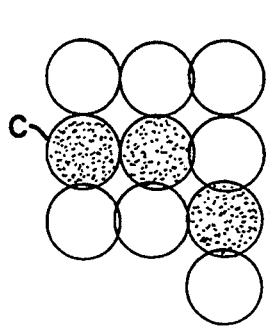
Figure 6:
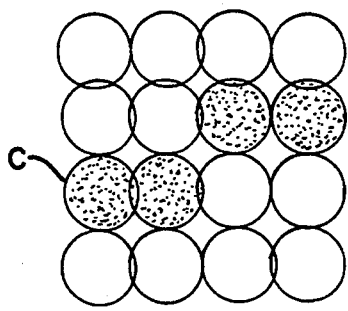
Figure 7:
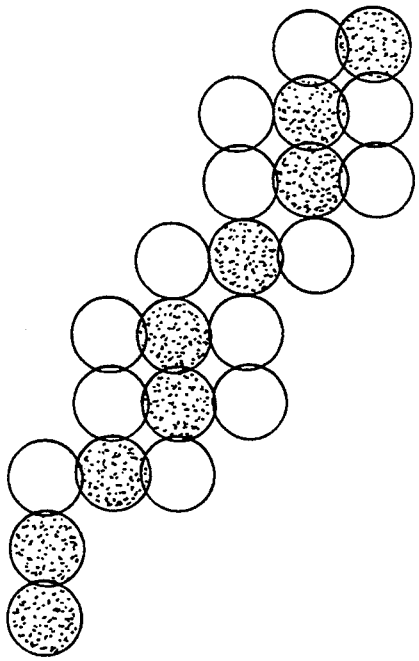
FIGS. 7 and 8 shows examples of other kind of defects detectable by the apparatus of present invention.
Figure 8:
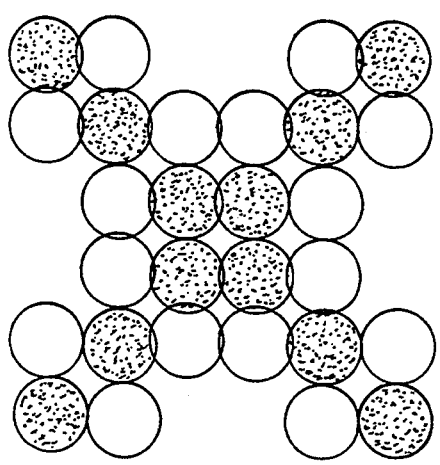

In a second scanning phase, the sequencer may detect if the line ends, if it continues in regular way, or if an anomaly arises which may be positive (step up) as shown in FIG. 4 or negative (step down) as shown in FIG. 5. Assuming a positive anomaly is detected, the sequencer 15 takes a second state.

In a third scanning phase, the sequencer 15 can verify if the detected anomaly develops in a line parallel to the one of the central bit (FIG. 6) and so on.

The final state taken by sequencer 15 is therefore indicative of the detection of a nearly horizontal line comprising the central element and consisting in two segments divided by a step, whose distance from the central element is identified. A similar information may be provided by sequencer 16 detecting an anomaly on the left side of the central element.

A process analogous to the described one may be performed by sequencers 17, 18 to detect anomalies related to lines extending in a nearly vertical direction.

Depending on the state taken by the sequencers, they output coded signals which, through channels 41, 42, 43, 44 are input to the decoding network 45.

Decoding network 45, enabled by signal CK3 at the end of the scanning operations, generates and outputs on channel 8 a correction code indicative of the correction to be performed in the visualization of the central bit. The correction, depending on the available correction mechanisms may consist of shifting the central bit when it is visualized or in a modification of its size or both.

The preceding example is related to the detection of anomalies in horizontal or vertical.lines. However, completely equivalent is the process for detecting other kind of anomalies, related to diagonal lines (FIG. 7) to lines intersection (FIG. 8), to edges of figures, to serifs, to corners, all represented by an image bit map, and for which it is intended to make corrections enhancing the visual representation of the image.

The process of severing the analysis of the bit patterns in phases and orientation as to a central bit, enables drastic reduction of the number of bit patterns which must be detected and makes possible the execution of the analysis operations in real time, with a very simple apparatus which can be embodied in the form of an integrated circuit. The preceding description is related to a preferred embodiment to which several modifications can be made.

For instance the number of analyzed bits may be choosen in a broad range and is not limited to scan matrix of 5 by 8 bits. Likewise it is not required, although preferable because it reduces the number of subsequent scan phases, that the first analysis phase be jointly performed on the bit row (or column) comprising the central bit, and the next adjacent row (or column) on one side. To this purpose and using the described structure shown in FIG. 2, it sufficies that sequencers 15, 16, 17, 18 be timed by signal CK3 (in case suitably delayed) in addition to signal CK4 in order to have the sequencers taking in a first phase a state which depends on the pattern of the only row (column) containing the central bit, and subsequently evolving, due to signal CK4, as a function of the bit pattern of the adjacent rows and columns.

I claim:

1. Apparatus for the detection and correction of digitized image defects, the image being represented by a bit map arranged in rows and columns of bits each having one of two logical levels, said correction being performed by visualization of said bits as dots modified in size, position or both comprising:

a plurality of registers storing a group of bits representing a portion of said image, said group of bits comprising a central bit to be visualized and bits in rows and columns adjacent to said central bit, timing and control means for storing into said plurality of registers and outputting therefrom, with a plurality of subsequent read operations:

(i) said central bit, the bits in the same row and column of said central bit, and the bits in the rows and columns next adjacent, at both sides of said central bit row and column, with at least a first read operation, and (ii) the bits of the rows and columns next adjacent on the side opposed to said central bit, to the bit rows and columns read with the immediately preceding read operation, at any subsequent read operation, a first logical sequencer coupled to said plurality of registers for receiving and analyzing, with a plurality of subsequent analysis operations, each corresponding to one of said read operations, the logical level of said central bit, of the bits in the same column of said central bit and of the bits in the column next adjacent to the left, in at least a first analysis operation, and for each subsequent analysis operation, the logical level of the bits in each of the subsequent bit columns, adjacent at the left of said central bit, said first logical sequencer outputting a binary code related to the performed analysis and identifying a stepwise discontinuity detected in the pattern represented by said analyzed bit levels, a second logical sequencer coupled to said plurality of registers for receiving and analyzing, with a plurality of subsequent analysis operations, each corresponding to one of said read operations, the logical level of said central bit, of the bits in the same column of said central bit and of the bits in the column next adjacent on the right, in at least a first analysis operation, and for each subsequent analysis operation, the logical level of the bits in each of the subsequent bit columns, adjacent on the right of said central bit, said second logical sequencer outputting a binary code related to the performed analysis and identifying a stepwise discontinuity detected in the pattern represented by said analyzed bit levels, a third logical sequencer coupled to said plurality of registers for receiving and analyzing, with a plurality of subsequent analysis operations, each corresponding to one of said read operations, the logical level of said central bit, of the bits in the same row of said central bit and of the bits in the row next adjacent above said central bit, in at least a first analysis operation, and for each subsequent analysis operation, the logical level of the bits in each of the subsequent bit rows, adjacent and above said central bit, said third logical sequencer outputting a binary code related to the performed analysis and identifying a stepwise discontinuity detected in the pattern represented by said analyzed bit levels, a fourth logical sequencer coupled to said plurality of registers for receiving and analyzing, with a plurality of subsequent analysis operations, each corresponding to one of said read operations, the logical level of said central bit, of the bits in the same row of said central bit and of the bits in the row next adjacent below said central bit, in at least a first analysis operation, and for each subsequent analysis operation, the logical level of the bits in each of the subsequent bit rows, adjacent and below said central bit, said fourth logical sequencer outputtinq a binary code related to the performed analysis and identifying a stepwise discontinuity detected in the pattern represented by said analyzed bit levels, and logic means, coupled to said first second, third and fourth logical sequencers for receiving said binary codes representative of the logical state taken by said first, second, third, and fourth logical sequencers, said logic means outputting a correction code representative of the detected defect and the correction to be made in the visualization of the dot represented by said central bit, as a function of said received binary codes.

2. The apparatus of claim 1, wherein said plurality of registers comprises a first bank of shift registers for storing bit columns at the left of said central bit, a second bank of shift registers for storing bit columns at the right of said central bit, a third bank of shift registers for storing bit rows below said central bit, a fourth bank shift of registers for storing bit rows above said central bit, and a first register storing a bit column comprising said central bit and a second shift register storing a bit row comprising said central bit.

3. Apparatus for the detection and correction of digitized image defects, the image being represented by a bit map arranged in rows and columns of bits each having one of two logical levels, said correction being performed by visualization of said bits as dots modified in size, position or both comprising:

a plurality of registers storing a group of bits representing a portion of said image, said group of bits comprising a central bit to be visualized and bits in rows and columns adjacent to said central bit;

timing and control means for shifting one cell of said group of bits stored in said registers with a first timing control signal (CK3) having a first period related to a visualization rate of said bits by a visualization unit and for storing into said plurality of registers and outputting therefrom, with a plurality of subsequent read operations, timed by a second timing control signal (CK4) and all performed within said first period:

(i) said central bit, the bits in the same row and column of said central bit, and the bits in the rows and columns next adjacent, at both sides of said central bit row and column, with at least a first read operation, and (ii) the bits of the rows and columns next adjacent on the side opposed to said central bit, to the bit rows and columns read with the immediately preceding read operation, at any subsequent read operation;

a first logical sequencer coupled to said plurality of registers for receiving and analyzing, with a plurality of subsequent analysis operations, each corresponding to one of said read operations, the logical level of said central bit, of the bits in the same column of said central bit and of the bits in the column next adjacent to the left, in at least a first analysis operation, and for each subsequent analysis operation, the logical level of the bits in each of the subsequent bit columns, adjacent at the left of said central bit, said first logical sequencer outputting a binary code related to the performed analysis and identifying a stepwise discontinuity detected in the pattern represented by said analyzed bit levels;

a second logical sequencer coupled to said plurality of registers for receiving and analyzing, with a plurality of subsequent analysis operations, each corresponding to one of said read operations, the logical level of said central bit, of the bits in the same column of said central bit and of the bits;

a third logical sequencer coupled to said plurality of registers for receiving and analyzing, with a plurality of subsequent analysis operations, each corresponding to one of said read operations, the logical level of said central bit, of the bits in the same row of said central bit and of the bits in the row next adjacent above said central bit, in at least a first analysis operation, and for each subsequent analysis operation, the logical level of the bits in each of the subsequent bit rows, adjacent and above said central bit, said third logical sequencer outputting a binary code related to the performed analysis and identifying a stepwise discontinuity detected in the pattern represented by said analyzed bit levels;

a fourth logical sequencer coupled to said plurality of registers for receiving and analyzing, with a plurality of subsequent analysis operations, each corresponding to one of said read operations, the logical level of said central bit, of the bits in the same row of said central bit and of the bits in the row next adjacent below said central bit, in at least a first analysis operation, and for each subsequent analysis operation, the logical level of the bits in each of the subsequent bit rows, adjacent and below said central bit, said fourth logical sequencer outputting a binary code related to the performed analysis and identifying a stepwise discontinuity detected in the pattern represented by said analyzed bit levels;

logic means, coupled to said first, second, third and fourth logical sequencers for receiving said binary codes representative of the logical state taken by said first, second, third, and fourth logical sequencers, said logic means outputting a correction code representative of the detected defect and the correction to be made in the visualization of the dot represented by said central bit, as a function of said received binary codes.

4. The apparatus of claim 3 wherein said plurality of registers comprises:

a first bank of shift registers for storing bit columns at the left of said central bit, a second bank of shift registers for storing bit columns at the right of said central bit, a third bank of shift registers for storing bit rows below said central bit, a fourth bank of shift registers for storing bit rows above said central bit, a first register storing a bit column comprising said central bit, and a second shift register storing a bit row comprising said central bit.

5. The apparatus of claim 3 further including:

a visualization unit, and visualization unit control circuits, coupled to said logic means for receiving said correction code therefrom, and for controlling by said code the visualization of the dot represented by said central bit.

* * * * *

UNITED STATES PATENT AND TRADEMARK OFFICE
CERTIFICATE OF CORRECTION

PATENT NO. : 5,373,569
DATED : December 13, 1994
INVENTOR(S) : Zulian

It is certified that error appears in the above-indentified patent and that said Letters Patent is hereby corrected as shown below:

ON THE TITLE PAGE:

--[30]  Foreign Application Priority Data

May 15, 1992   [EP]    European Pat. Off. . . . . . . . . . . . . . . 92830227.2--.

Signed and Sealed this

Twenty-eighth Day of October, 1997

Attest:

BRUCE LEHMAN

*Attesting Officer*      Commissioner of Patents and Trademarks